US005442244A

United States Patent [19]
Furui

[11] Patent Number: 5,442,244
[45] Date of Patent: Aug. 15, 1995

[54] STARTING CIRCUIT OF PASSENGER PROTECTING APPARATUS

[75] Inventor: Takashi Furui, Hyogo, Japan

[73] Assignee: Mitsubishi Denki Kabushiki Kaisha, Tokyo, Japan

[21] Appl. No.: 68,218

[22] Filed: May 28, 1993

[30] Foreign Application Priority Data

May 28, 1992 [JP] Japan .................................. 4-160057

[51] Int. Cl.6 ............................................. B60R 21/32
[52] U.S. Cl. ................................. 307/10.1; 180/282; 280/735; 340/436
[58] Field of Search ............... 307/9.1, 10.1; 340/669, 340/436, 438, 440; 280/728 R, 734, 735; 180/271, 274, 282; 200/61.45 R

[56] References Cited

U.S. PATENT DOCUMENTS

| 4,980,573 | 12/1990 | White et al. | 307/10.1 |
| 5,158,323 | 10/1992 | Yamamoto et al. | 280/735 |
| 5,192,838 | 3/1993 | Breed et al. | 200/61.45 R |
| 5,205,582 | 4/1993 | Shiga et al. | 280/735 |
| 5,309,030 | 5/1994 | Schultz | 307/10.1 |
| 5,311,065 | 5/1994 | Kondo | 307/10.1 |

FOREIGN PATENT DOCUMENTS

| 0396265 | 11/1990 | European Pat. Off. . |
| 0453255 | 10/1991 | European Pat. Off. . |
| 4129314 | 3/1992 | Germany . |
| 55-63245 | 4/1980 | Japan . |
| 9105680 | 5/1991 | WIPO . |

Primary Examiner—Todd DeBoer
Assistant Examiner—Richard T. Elms

[57] ABSTRACT

A starting apparatus is provided to start at least a two passenger protecting apparatus. In the starting apparatus, an auxiliary power supply has a capacitor supplied by a power source which is mounted to a vehicle, and is independently provided for each passenger protecting apparatus. Further, an acceleration switch serves to feed current from the auxiliary power supply to a squib for starting the passenger protecting apparatus when a vehicle acceleration exceeds a predetermined acceleration. The acceleration switch is provided for only one squib, and make and break of this switch is detected. If the switch is closed, switches corresponding to other squibs are turned ON so that current is fed to the squibs from each auxiliary power supply.

19 Claims, 8 Drawing Sheets

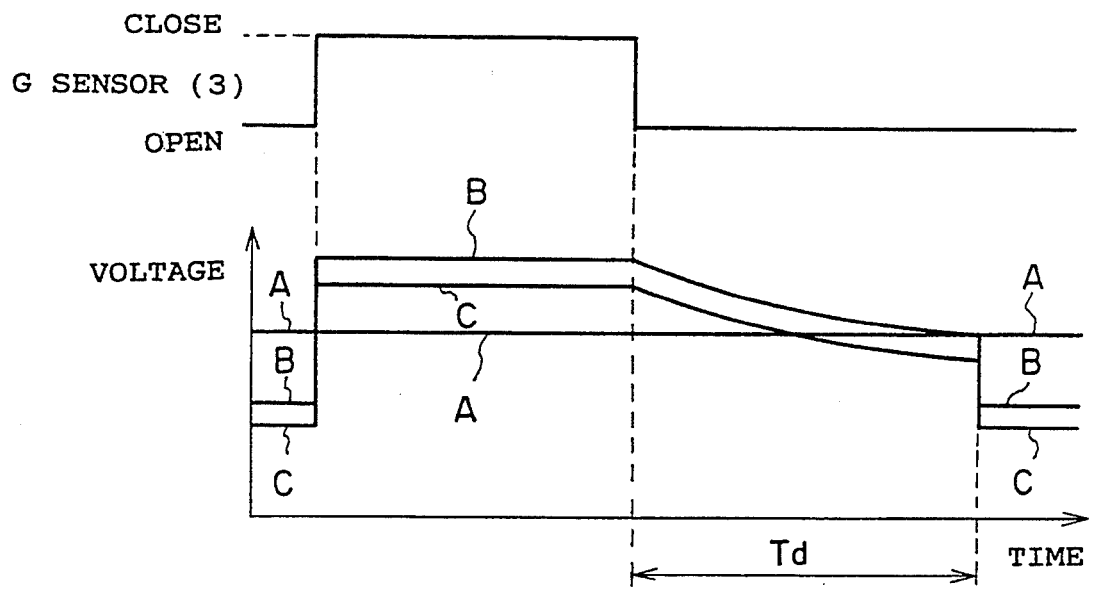
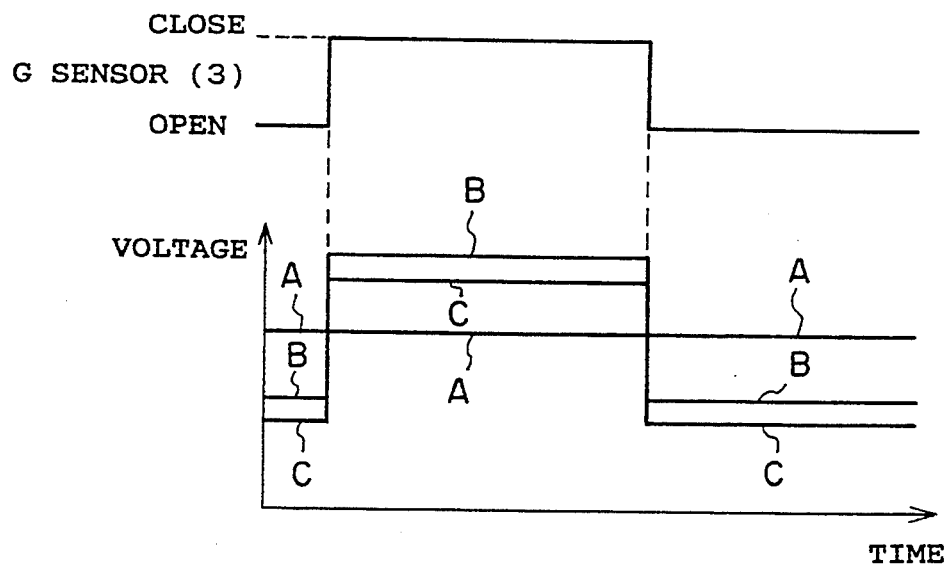

STARTING CIRCUIT OF PASSENGER PROTECTING APPARATUS

BACKGROUND OF THE INVENTION

1. Field of the Invention

The present invention relates to a starting circuit of a passenger protecting apparatus such as air bag or seat belt pretensioner, which is actuated by detecting collision of a vehicle.

2. Description of the Prior Art

FIG. 9 illustrates a starting circuit of a conventional passenger protecting apparatus which is disclosed in, for example, Japanese Utility Model Application Laid-Open No. 55-63245. In FIG. 9, reference numeral 1 refers to a DC power source such as a battery for use in a vehicle, numeral 2 refers to an ignition switch serially connected to the DC power source 1, and numerals 3 and 4 refer to acceleration sensors (hereafter referred to as G sensors) having mechanical contacts 3b, 4b which are closed by collision. Further, reference numerals 3a, 4a refer to resistors of about 1 kΩ, which are connected in parallel with the mechanical contacts 3b and 4b of the G sensors 3, 4 so as to feed slight monitor current in case the mechanical contacts are open. Reference numerals 10, 20 and 30 refer to squibs having resistances of several ohms for actuating the passenger protecting apparatus, and numerals 11, 21 and 31 refer to diodes serially connected to the squibs 10, 20 and 30, respectively. Reference numeral 12 refers to an auxiliary power supply for supplying the squibs 10, 20 and 30 with current in case a supply of current from the DC power source 1 is interrupted when a collision occurs. The auxiliary power supply 12 includes a resistor 12a, a capacitor 12b, and a diode 12c.

The operation will now be described. The G sensor 4 is referred to as a front G sensor because it is mounted in a front portion of a vehicle. The G sensor 4 is set such that the mechanical contact 4b is closed only when the G sensor 4 actually senses impact to start the passenger protecting apparatus. On the other hand, the G sensor 3 mounted in a vehicle cabin is referred to as a safety G sensor, and is set such that the mechanical contact 3b can be closed by even relatively soft impact. When the mechanical contacts 3b and 4b of the G sensors 3 and 4 are in a closed condition simultaneously, the DC power source 1 or the auxiliary power supply 12 supplies ignition current to the squibs 10, 20, and 30 so as to actuate the passenger protecting apparatus.

The starting circuit of the conventional passenger protecting apparatus is provided as set forth hereinbefore. That is, the plurality of squibs 10, 20 and 30 are connected to a common feeding circuit in parallel with each other. Accordingly, there are problems in that the resistances of the squibs may be unbalanced, and the passenger protecting apparatus may not start since the ignition current can not flow uniformly if any one of the squibs is short-circuited.

SUMMARY OF THE INVENTION

It is an object of the present invention to provide a starting apparatus of a passenger protecting apparatus which can be normally operated even if a plurality of squibs each have different resistances.

It is another object of the present invention to provide a starting apparatus in which, even if any one of the plurality of squibs is short-circuited, the passenger protecting apparatus can be normally started by the remaining normal squibs.

In order to achieve the objects set forth above, an auxiliary power supply is provided for each squib in a starting apparatus of a passenger protecting apparatus of the present invention. Hence, any squibs can be normally operated even if the squibs have a variety of resistances. Further, even if any one of the squibs is short-circuited, other squibs can be normally operated.

In the starting apparatus of the present invention, a semiconductor switch is provided to feed current into other squibs by detecting make and break of a switch of an acceleration sensor which is provided corresponding to a single squib. Therefore, only one mechanical acceleration sensor is sufficient, resulting in a small-sized apparatus.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIG. 3 is a voltage waveform diagram illustrating an operation of the second embodiment shown in FIG. 2;

FIG. 4 is a voltage waveform diagram illustrating the operation of the second embodiment shown in FIG. 2;

DETAILED DESCRIPTION OF THE PREFERRED EMBODIMENTS

Preferred embodiments of the invention will now be described in detail referring to the accompanying drawings.

Embodiment 1

Figure 1:
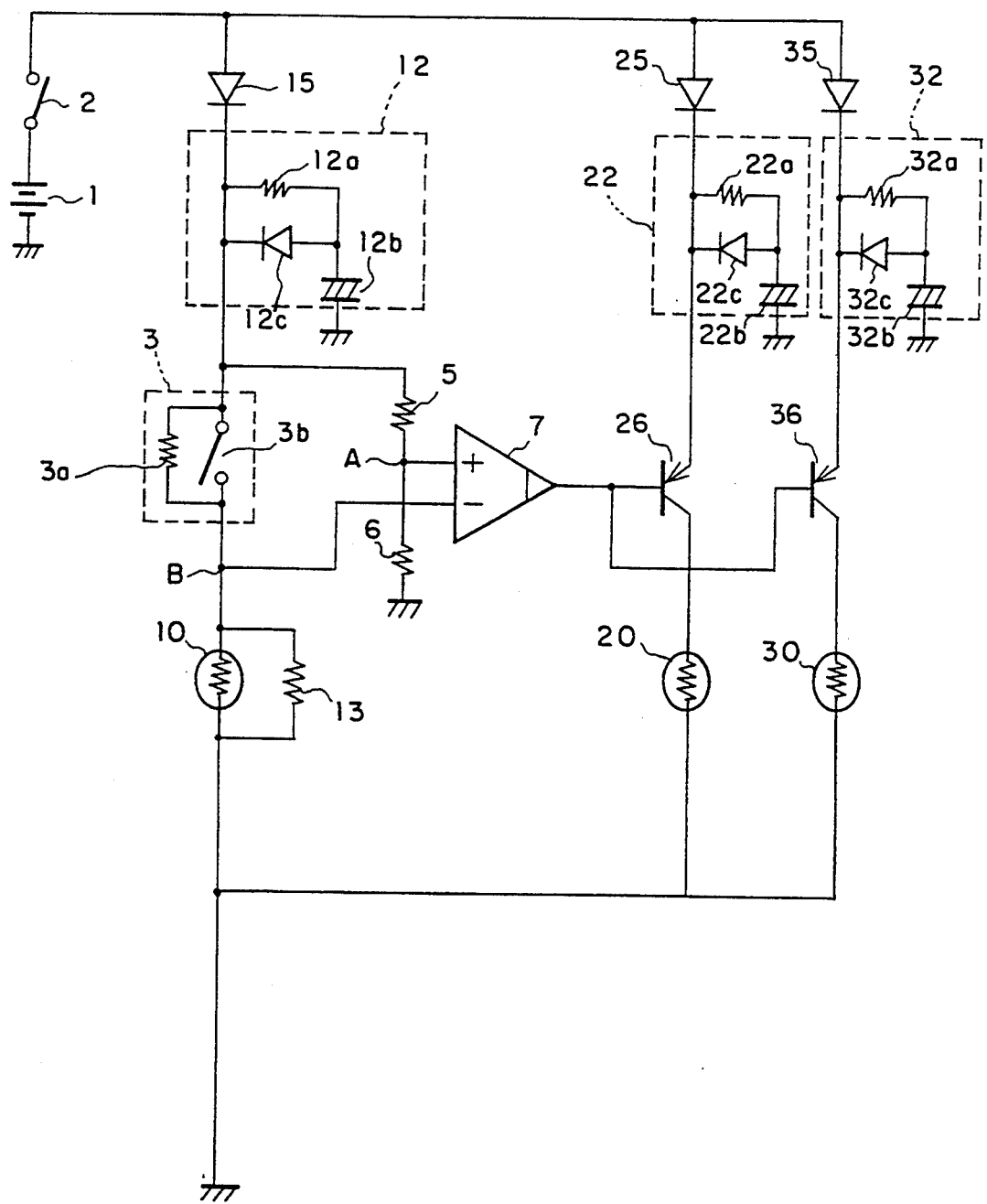
FIG. 1 is a block diagram of a first embodiment of a starting circuit of a passenger protecting apparatus according to the present invention.
Figure 9:
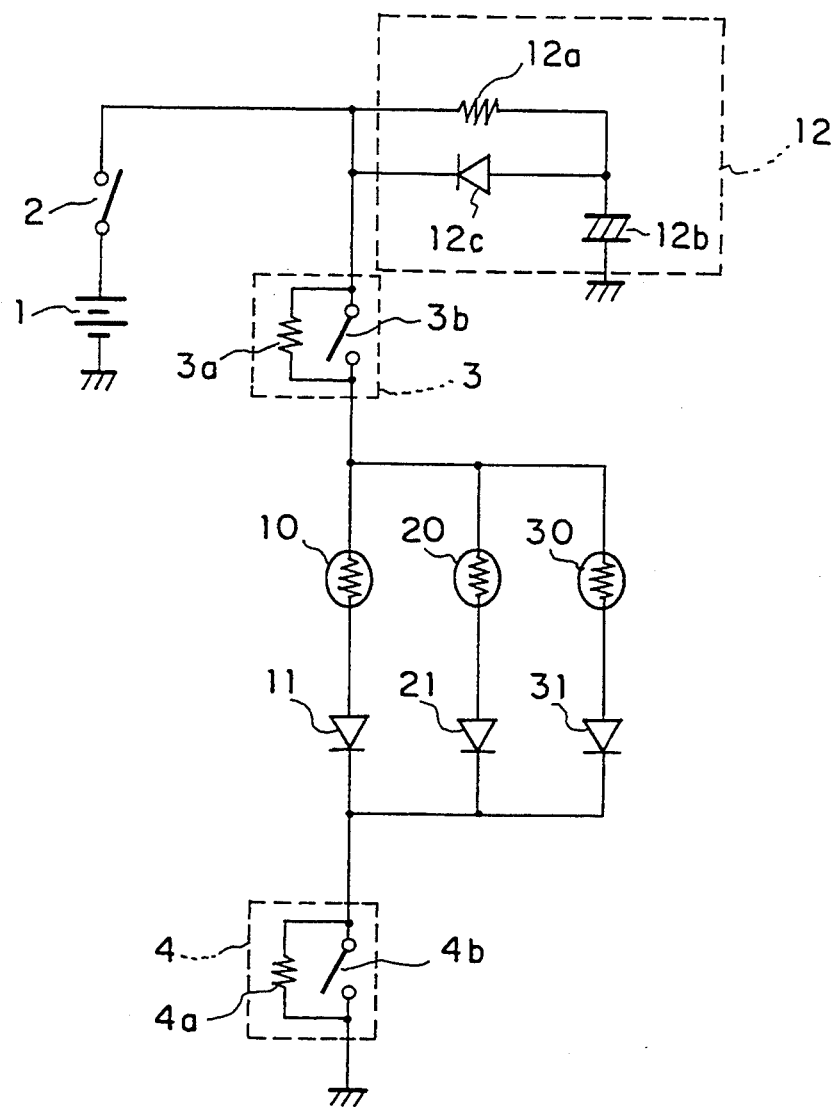
FIG. 9 is a block diagram of the starting circuit of a conventional passenger protecting apparatus.

FIG. 1 is a circuit diagram showing a configuration of a first embodiment of a starting circuit of a passenger protecting apparatus according to the present invention. In FIG. 1, components designated by reference numerals 1 to 3, 10, 12, 20 and 30 are identical with those in the prior art shown in FIG. 9. Accordingly, the same reference numerals are used, and the descriptions thereof are omitted. Reference numerals 15, 25 and 35 refer to diodes, and reference numerals 22 and 32 refer to auxiliary power supplies identical with the auxiliary power supply 12 shown in FIG. 9. The auxiliary power supplies 22, 32 include resistors 22a, 32a, capacitors 22b, 32b, and diodes 22c, 32c. Reference numeral 7 refer to a comparator. Negative input terminal of the comparator 7 is connected to a node B of the G sensor 3 and the squib 10, and the positive input terminal thereof is connected to a node A of resistors 5 and 6 which are connected between a power source terminal of the G sensor and the ground. Further, reference numerals 26, 36 refer to transistors connected to power source terminals of the squibs 20, 30, and the transistors 26, 36 are driven by output from the comparator 7. Reference numeral 13 refers to a resistor of about 1 kΩ, which is connected in parallel with the squib 10.

A description will now be given of the operation of the starting circuit of the passenger protecting apparatus. When the ignition switch 2 is closed, the capacitors 12b, 22b, 32b of the auxiliary power supplies 12, 22, 32 are charged through the diodes 15, 25 and 35, and the resistors 12a, 22a and 32a. The comparator 7 is set such that voltage at the positive input terminal thereof becomes higher than that at the negative input terminal thereof while the G sensor 3 is open. Thus, the comparator 7 outputs a signal "H" while the G sensor 3 is open. The signal "H" is input into bases of the transistors 26 and 36 so that the transistors 26, 36 are turned OFF.

However, if the contacts 3b of the G sensor 3 is closed due to impact generated by collision of the vehicle, the negative input terminal has higher voltage than that of the positive input terminal. Consequently, the comparator outputs a signal "L" so that the transistors 26, 36 are turned ON. As a result, starting current is supplied from the capacitors 12b, 22b and 32b of the auxiliary power supplies 12, 22 and 32 to the squibs 10, 20 and 30 through the diodes 12c, 22c and 32c. Accordingly, even if a fault such as short-circuit occurs in any one of the squibs, there is no adverse effect to conduction with respect to other normal squibs. Further, the squib 10 is connected in parallel with the resistor 13 so that the comparator 7 never outputs the signal "LOW" even if the squib 10 is cut off due to the fault when the contact 3b of the G sensor 3 is open.

Embodiment 2

Figure 2:
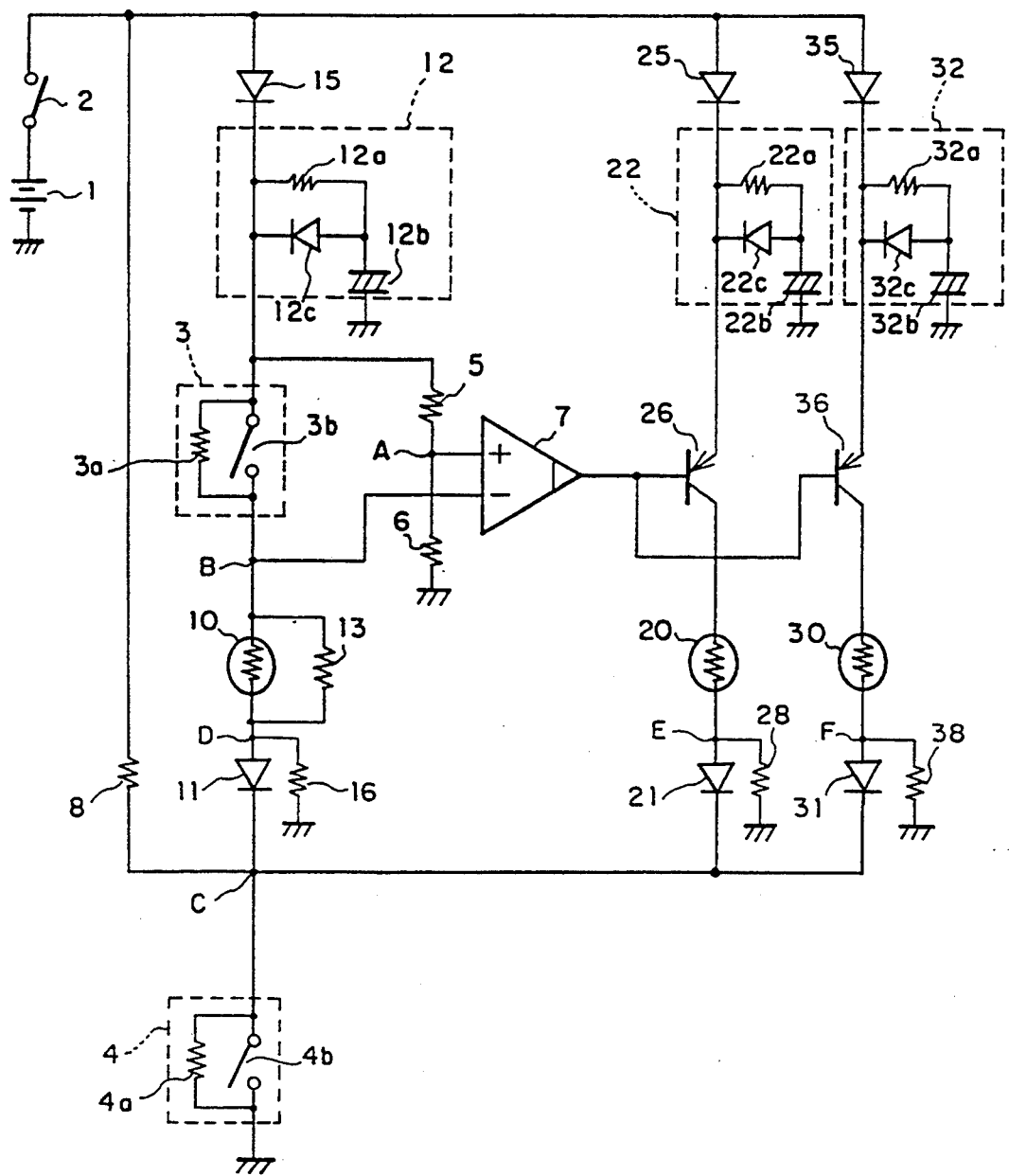
FIG. 2 is a block diagram of a second embodiment of the starting circuit of the passenger protecting apparatus according to the present invention.

FIG. 2 is a circuit diagram showing a configuration of a second embodiment of a passenger protecting apparatus of the present invention. In FIG. 2, components identical with those of FIG. 1 are designated by the same reference numerals, and the descriptions thereof are omitted. Reference numeral 4 refers to a second G sensor connected between the plurality of squibs 10, 20, 30 and the ground so as to close a contact 4b by detecting an impact having a predetermined magnitude or larger. Reference numeral 4a refers to a resistor connected in parallel with the contact 4b, and 11, 21 and 31 are diodes serving as devices for conducting from the squibs 10, 20 and 30 to the second G sensor 4 in one direction of connections. Reference numeral 8 refers to a resistor of about 1 kΩ, which is connected between a node C of the second G sensor 4 and cathodes of the diodes 11, 21 and 31, and the ignition switch 2. Further, reference numerals 16, 28 and 38 refer to resistors of about 1 kΩ, which are connected between nodes D, E, F of the squibs 10, 20, 30 and anodes of the diodes 11, 21, 31, and the ground.

A description will now be given of the operation of the starting circuit of the passenger protecting apparatus according to the second embodiment. As in the first embodiment, the contact 3b of the G sensor 3 is closed due to the impact generated by the collision of the vehicle, and concurrently the transistors 26, 36 are turned ON. If the contact 3b of the G sensor 3 and the contact 4b of the G sensor 4 are closed concurrently, the squibs 10, 20 and 30 are started by receiving the starting current from the capacitors 12b, 22b, 32b of the auxiliary power supplies 12, 22, 32.

A description will now be given of the operations of the diodes 11, 21, 31 and the resistors 8, 16, 28, 38. First, it is assumed that there are provided neither the diodes nor the resistors.

Under the assumption, if only the contact 3b of the G sensor 3 is closed when the contact 4b of the G sensor 4 is open, and subsequently the contact 3b of the G sensor 3 is opened, there is a considerable time lag until the transistors 26 and 36 are turned OFF. The reason for the time lag will now be described with reference to FIG. 3. If the transistors 26, 36 are ON when the contact 3b of the G sensor 3 is open, potential at the node C drops gradually. Accordingly, potential at the negative terminal of the comparator 7, that is, potential at the node B drops so as to be less than potential at the positive terminal of the comparator 7, that is, potential at the node A. At this time, in other words, when time period of Td seconds elapses after the contact 3b of the G sensor 3 is open, the transistors 26, 36 are turned OFF. In case only the contact 4b of the G sensor 4 is closed during the time period of Td seconds, the transistors 26, 36 are still ON until the potential at the node B drops so as to cause the comparator 7 to output HIGH. Hence, large current may possibly flow through only the squibs 20 and 30.

However, in the second embodiment, when the contacts 3b, 4b of the G sensors 3, 4 are open, current on the side of the anodes of the diodes 11, 21, 31 is bypassed to the ground level by the resistors 8, 16, 28, 38. Therefore, as shown in FIG. 4, in case only the contact 3b of the G sensor 3 is closed when the contact 4b of the G sensor is open and subsequently the contact 3b of the G sensor 3 is open, the current on the side of the anode of the diode 11 is bypassed by the resistor 16. Accordingly, the potential at the negative terminal of the comparator 7, that is, the potential at the node B drops. Subsequently, the potential at the node B is less than that at the positive terminal of the comparator 7, that is, the potential at the node A so that the transistors 26, 36 are turned OFF. As a result, there is no time lag as shown in FIG. 3.

Embodiment 3

Figure 5:
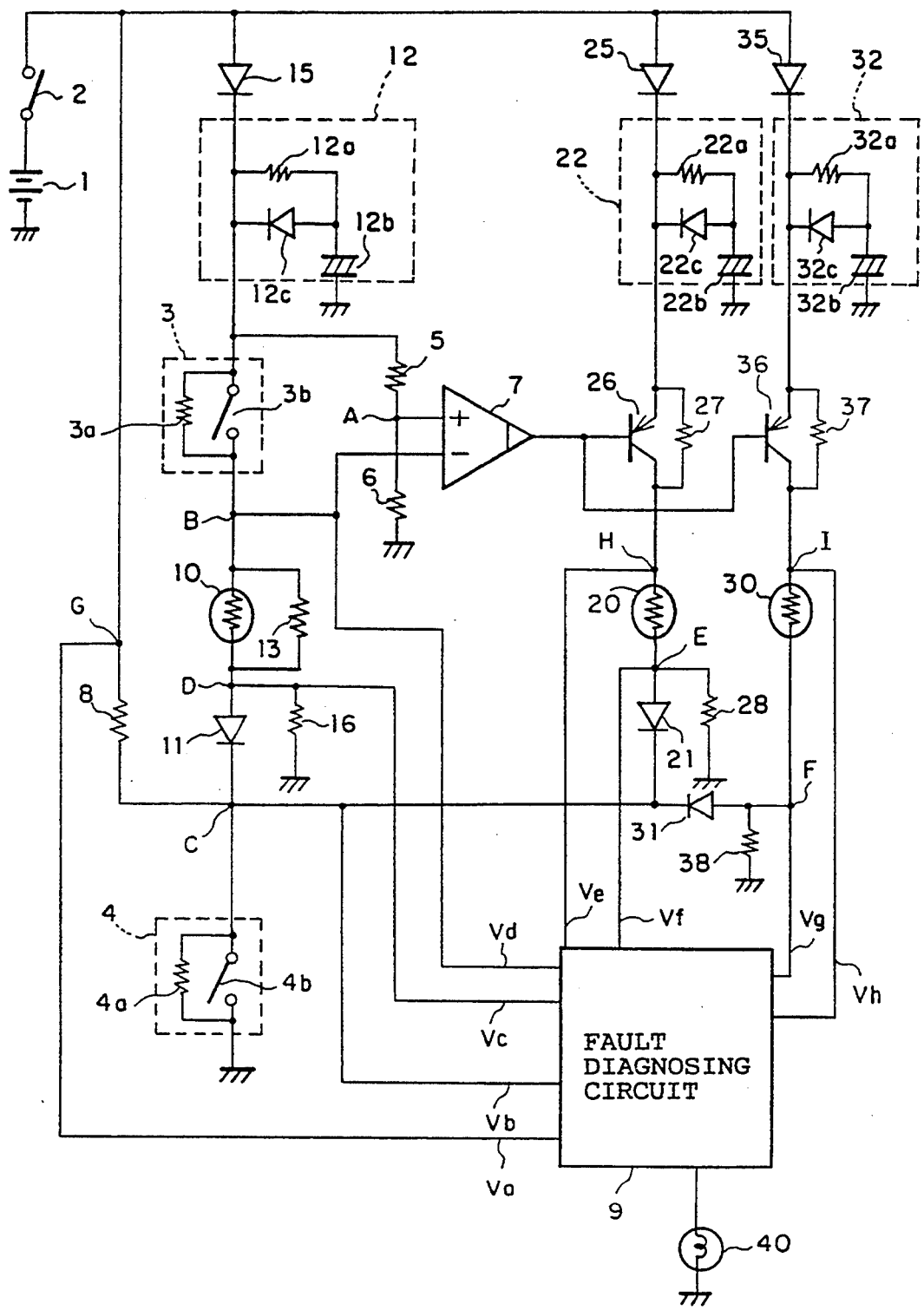
FIG. 5 is a block diagram of a third embodiment of the starting circuit of the passenger protecting apparatus according to the present invention.

FIG. 5 is a circuit diagram showing a configuration of a third embodiment of a starting circuit of a passenger protecting apparatus of the present invention. In FIG. 5, components identical with those shown in FIG. 2 are designated by the same reference numerals, and the descriptions thereof are omitted.

In FIG. 5, reference numeral 9 refers to a fault diagnosing circuit employing a microcomputer which can measure analog voltage. Each section of the fault diagnosing circuit 9 is connected to nodes G, C, D, B, H, E, F, I, and serves to input voltage Va, Vb, Vc, Vd, Ve, Vf, Vg, Vh. Reference numerals 27, 37 refer to resistors of about 1 kΩ, which are connected in parallel with the transistors 26 and 36, and serve to feed slight monitor current to the squibs 20 and 30 when the transistors 26 and 36 are OFF. Reference numeral 40 refers to an alarm lamp connected to the fault diagnosing circuit 9.

Figure 6:
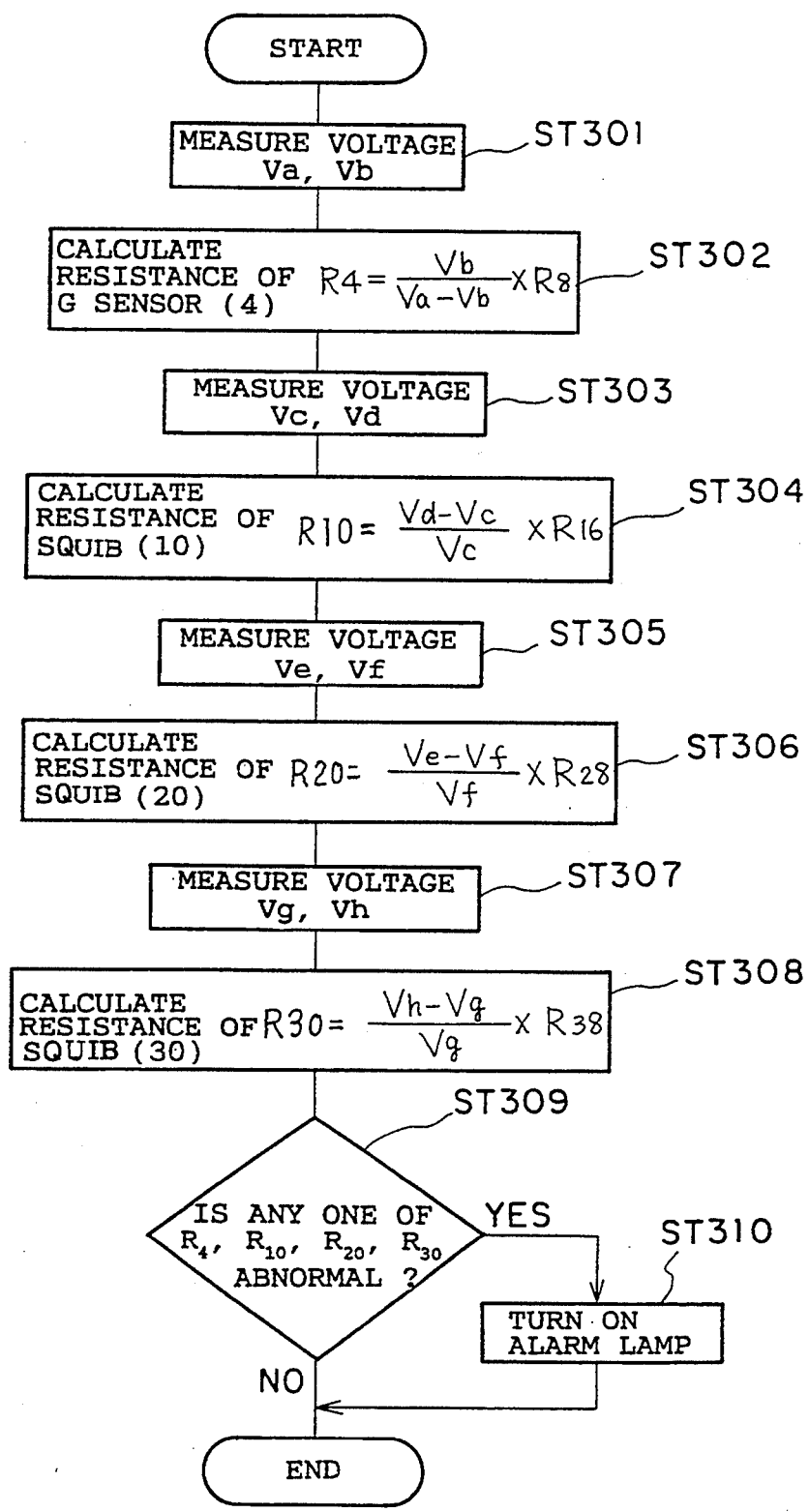
FIG. 6 is a flowchart showing an operation of fault diagnosis according to the third embodiment shown in FIG. 5.

A description will now be given of the operation of the third embodiment. As in the second embodiment shown in FIG. 2, the contacts 3b, 4b of the G sensors 3, 4 are closed due to impact generated by the collision of the vehicle so as to start the squibs 10, 20 and 30. The detail description thereof are omitted, and the operation of the fault diagnosing circuit 9 will now be described with reference to a flowchart of FIG. 6. At Step ST301, voltage Va and Vb are measured, and a resistance $R_4$ of the G sensor 4 is calculated by the following expression (1) at Step ST302:

$$R_4 = Vb/(Va-Vb) \times R_8 \quad (1)$$

where $R_8$ is a resistance of the resistor 8. Subsequently, voltage Vc and Vd are measured at Step ST303, and a resistance $R_{10}$ of the squib 10 is calculated by the following expression (2) at Step ST304:

$$R_{10} = (Vd-Vc)/Vc \times R_{16} \quad (2)$$

where $R_{16}$ is a resistance of the resistor 16. In actuality, it is necessary to find a combined resistance of the resistances of the squib 10 and resistor 13 which are connected in parallel with each other. However, it can be considered that the combined resistance is substantially equal to the resistance of the squib 10 since the resistance of the squib 10 is extremely smaller than that of the resistor 13. Next, voltage Ve and Vf are measured at Step ST305, and a resistance $R_{20}$ of the squib 20 is calculated by the following expression (3) at Step ST306:

$$R_{20} = (Ve-Vf)/Vf \times R_{28} \quad (3)$$

where $R_{28}$ is a resistance of the resistor 28. Subsequently, voltage Vg and Vh are measured at Step ST307, and a resistance $R_{30}$ of the squib 30 is calculated by the following expression (4) at Step ST308:

$$R_{30} = (Vh-Vg)/Vg \times R_{38} \quad (4)$$

where $R_{38}$ is a resistance of the resistor 38. At Step ST309, it is decided whether or not any one of $R_4$, $R_{10}$, $R_{20}$, $R_{30}$ is abnormal by detecting these resistances. If any one of them is abnormal, the operation proceeds to Step ST310 where the alarm lamp 40 is turned ON so as to indicate occurrence of a fault to a driver.

Embodiment 4

Figure 7:
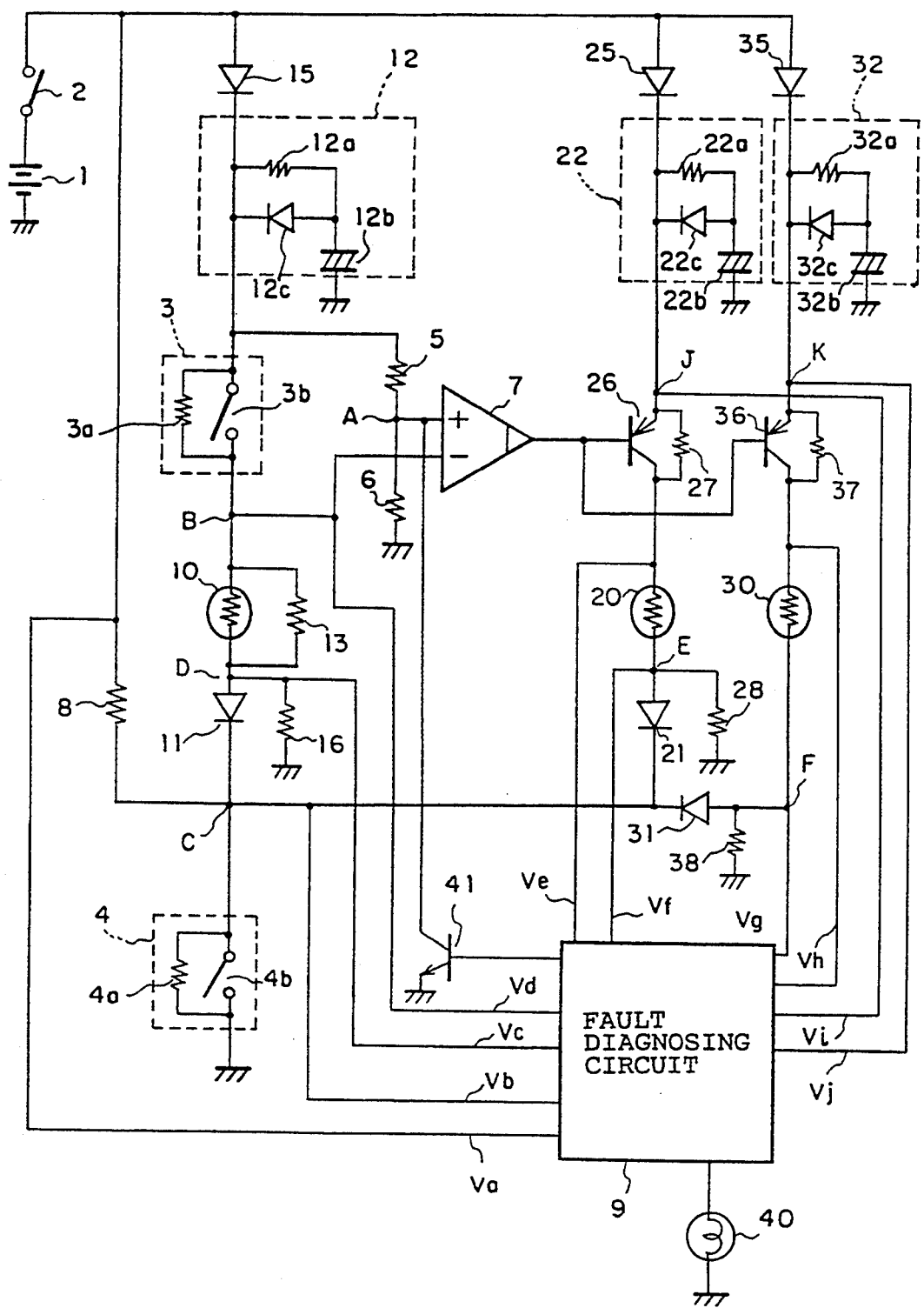
FIG. 7 is a block diagram of a fourth embodiment of the starting circuit of the passenger protecting apparatus according to the present invention.

FIG. 7 is a circuit diagram showing a configuration of a fourth embodiment of a passenger protecting apparatus of the present invention. In FIG. 7, components identical with those shown in FIG. 5 are designated by the same reference numerals, and the descriptions thereof are omitted. In FIG. 7, reference numeral 41 refers to a transistor which is controlled by the fault diagnosing circuit 9, and is connected between an input terminal of the comparator 7 and the ground. Further, the fault diagnosing circuit 9 is also connected to nodes J and K so as to input voltage Vi, Vj.

Figure 8:
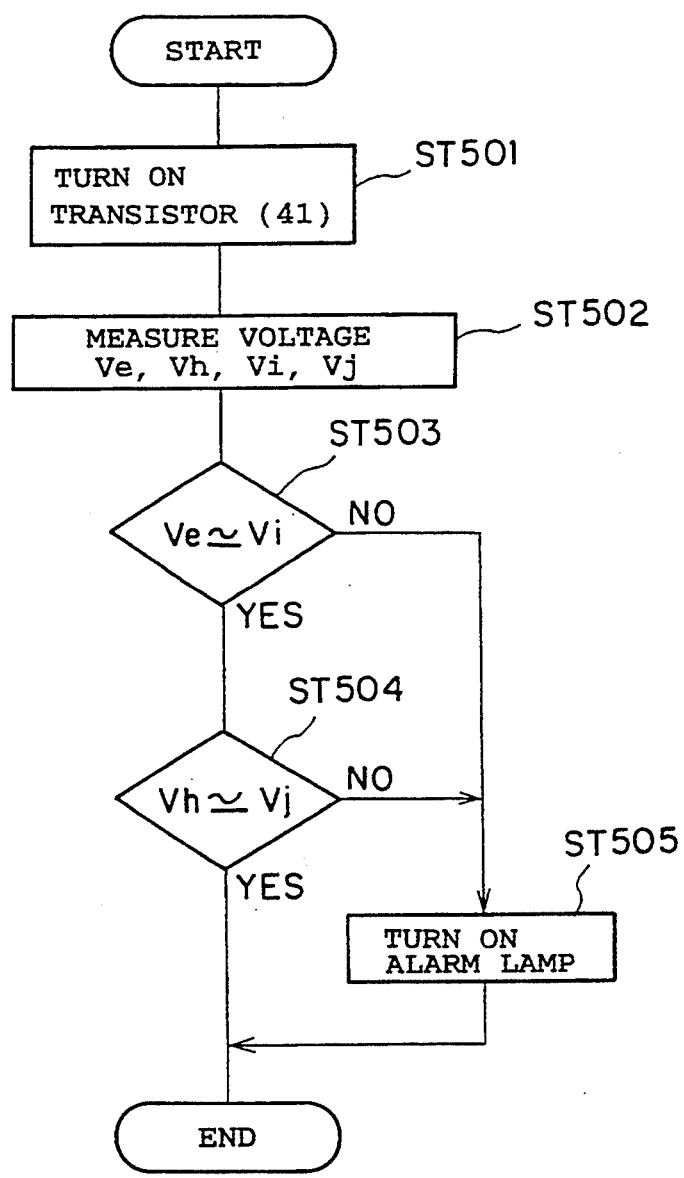
FIG. 8 is a flowchart showing an operation of the fault diagnosis according to the fourth embodiment shown in FIG. 7.

Though a description will now be given of the operation of the fourth embodiment with reference to a flowchart of FIG. 8, the description is limited to only the operation different from the operation in FIG. 5. At Step ST501, the transistor 41 is turned ON so as to lower the voltage of the positive terminal of the comparator 7 to the ground level. Consequently, the comparator 7 outputs LOW, and the transistors 26 and 36 are turned ON.

Next, at Step ST502, voltage Ve, Vh, Vi, Vj of collectors and emitters in the transistors 26 and 36 are measured. At Step ST503, the voltage Ve is compared with the voltage Vi, and at Step 504, the voltage Vh is compared with the voltage Vj. If the compared voltage are substantially equal, it is decided that the comparator 7 or the transistors 26, 36 are normal, resulting in no alarm. Otherwise, at Step ST505, the alarm lamp 40 is turned ON so as to indicate occurrence of fault to the driver.

While the invention has been described in terms of express embodiments, and alternatives have been suggested, it should be recognized that those skilled in the art may make modifications thereof without departing from the spirit and scope of the invention as defined in the appended claims.

What is claimed is:

1. A starting apparatus for starting a first and a second passenger protecting apparatus for protecting a passenger in a movable body from impact, said starting apparatus comprising:
   a first auxiliary power supply connected to a power source in said movable body, including a first capacitor charged by said power source;
   first starting means for starting said first passenger protecting apparatus by current supplied from said first auxiliary power supply;
   a first acceleration sensor, including a first switch for feeding said current from said first auxiliary power supplied to said first starting means upon sensing that acceleration of said movable body is a first predetermined value or greater;
   a second auxiliary power supply connected to said power source, including a second capacitor charged by said power source;
   second starting means for starting said second passenger protecting apparatus by current supplied from said second auxiliary power supply;
   control means for detecting potential across said first switch of said first acceleration sensor and for controlling a semiconductor switch of a switching means to be in one of an ON and OFF state based upon said detected potential; and
   said switching means, upon being controlled to be in an ON state, for feeding said current from said second auxiliary power supply to said second starting means upon said acceleration of said movable body being said first predetermined value or greater.

2. A starting apparatus according to claim 1 further comprising:
   a first diode provided between said power source and said first auxiliary power supply; and
   a second diode provided between said power source and said second auxiliary power supply.

3. A starting apparatus according to claim 2, wherein said control means detects opening and closing of said first switch of said first acceleration sensor, and turns OFF said switching means upon detecting that said first switch is closed.

4. A starting apparatus according to claim 1, wherein said control means includes a comparator for detecting potential across said first switch of said acceleration sensor, said control means controlling said semiconductor switch to be in one of an ON state and an OFF state according to an output signal from said comparator.

5. A starting apparatus according to claim 3 further comprising:

a second acceleration sensor connected to a terminal of said first starting means, and to a terminal of said second starting means including a second switch for turning ON and OFF current from said power source, said second acceleration sensor closing said second switch upon detecting an acceleration larger than a second predetermined value, which is larger than said first predetermined value.

6. A starting apparatus according to claim 5 further comprising:

means for forcedly setting voltage at a terminal to which said first starting means is connected, to a predetermined voltage when said first switch then turned ON and is subsequently turned OFF, upon said second switch being turned OFF.

7. A starting apparatus according to claim 3 further comprising:

resistance calculating means for calculating resistances of said first starting means and said second starting means by measuring voltage across terminals of said first starting means and said second starting means;

comparison means for comparing the calculated resistances with preset resistances, to determine whether or not said first starting means and said second starting means are normal; and means for providing a warning to a user upon said comparison means determining that at least one of the first and second starting means is abnormal.

8. A starting apparatus according to claim 3 further comprising:

a resistor connected in parallel with said switching means;

means for falsely producing an ON signal indicating that said first switch is turned ON, and feeding said falsely produced ON signal to said control means;

determining means for measuring voltage across said switching means to determine whether or not said switching means is normal; and means for providing a warning to a user upon said determining means determining that said switching means is abnormal.

9. A starting apparatus according to claim 3, wherein said first starting means and said second starting means are squibs through which current flows to generate heat so as to start said first passenger protecting apparatus and said second passenger protecting apparatus.

10. A starting apparatus according to claim 3, wherein at least one of said first passenger protecting apparatus and said second passenger protecting apparatus is an air bag apparatus.

11. A starting apparatus according to claim 3, wherein at least one of said first passenger protecting apparatus and said second passenger protecting apparatus is a seat belt pretensioner.

12. An activation apparatus for activating at least a first and second passenger protecting apparatus for protecting a passenger traveling in a movable body from internal impact with the movable body, said activation apparatus comprising:

first auxiliary power supply connected to a power source in said movable body;

first activation means for activating said first passenger protecting apparatus by current supplied from said first auxiliary power supply;

first acceleration sensor for sensing acceleration of the movable body, including a first switch for feeding said current from said first auxiliary power supply to said first activation means upon sensing that acceleration of the movable body is at least a first predetermined value;

second auxiliary power supply connected to said power source;

second activation means for activating said second passenger protecting apparatus by current supplied from said second auxiliary power supply;

switching means, including a second switch, for feeding the current from said second auxiliary power supply to said second activation means upon the acceleration sensed by the first acceleration sensor being at least a first predetermined value;

a resistor, connected in parallel with the switching means;

means for falsely producing a signal indicating that the first switch is ON;

determining means for measuring voltage across the second switch and for comparing the measured voltage to a reference voltage; and warning means for providing a warning to the user, upon the determining means determining that the compared measured and reference voltages are different, indicating an abnormal condition.

13. The activation apparatus of claim 12, wherein the reference voltage is a measured voltage representing normal operating conditions.

14. The activation apparatus of claim 12, wherein the switching means further includes a third switch, the determining means measuring voltage across both the second and third switches and the warning means providing a warning to the user upon the determining means determining that at least one of the compared measured voltages corresponding to the second and third switches are not equal to a reference voltage, indicating an abnormal condition in at least one of the second and third switches.

15. The activation apparatus of claim 12, further comprising:

control means for detecting potential across said first switch of said first acceleration sensor and for controlling the second switch of the switching means to be in one of an ON and OFF state based upon said detected potential.

16. The activation apparatus of claim 15, wherein the control means includes a comparator for detecting potential across the first switch, said second switch being controlled to be in one of an ON and OFF state based upon an output from the comparator.

17. The activation apparatus of claim 14, further comprising:

control means for detecting potential across said first switch of said first acceleration sensor and for controlling the second and third switches of the switching means to be in one of an ON and OFF state based upon said detected potential.

18. The activation apparatus of claim 17, wherein the control means includes a comparator for detecting potential across the first switch, said second and third switches being controlled to be in one of an ON and OFF state based upon an output from the comparator.

19. The activation apparatus of claim 18, wherein the determining means further measures voltage across the comparator and the warning means further provides a warning to the user upon the determining means determining that at least one of the compared voltages is not equal to the reference voltage, indicating an abnormal condition in at least one of the second switch, the third switch and the comparator.

* * * * *